United States Patent [19]

Martorano et al.

[11] 4,126,595

[45] Nov. 21, 1978

[54] AQUEOUS COATING COMPOSITIONS COMPRISING ACRYLIC OLIGOMERS, HIGH MOLECULAR WEIGHT POLYMERS AND CROSSLINKERS

[75] Inventors: Richard Martorano, Marlton, N.J.; William H. Brendley, Hatboro, Pa.

[73] Assignee: Rohm and Haas Company, Philadelphia, Pa.

[21] Appl. No.: 587,775

[22] Filed: Jun. 17, 1975

[51] Int. Cl.$^2$ .................. C08L 61/28; C08L 63/00
[52] U.S. Cl. ............... 260/29.4 UA; 260/29.6 RW; 260/29.6 WB; 260/29.6 TA; 428/418; 428/460; 428/500
[58] Field of Search ............ 260/29.4 UA, 29.6 RB, 260/851, 856, 29.6 WB, 29.2 N, 29.6 NR

[56] References Cited

U.S. PATENT DOCUMENTS

| | | | |
|---|---|---|---|
| 3,305,505 | 2/1967 | Ropp | 260/29.6 |
| 3,356,627 | 12/1967 | Scott | 260/29.6 |
| 3,919,154 | 11/1975 | Chang et al. | 260/29.4 UA |
| 3,926,888 | 12/1975 | Cheung et al. | 260/29.4 UA |
| 3,928,273 | 12/1975 | Chang et al. | 260/29.4 UA |

FOREIGN PATENT DOCUMENTS 959,999 12/1974 Canada.

*Primary Examiner*—Theodore E. Pertilla
*Attorney, Agent, or Firm*—Harold L. Greenwald

[57] ABSTRACT

This invention discloses stable water-based thermosettable coating compositions particularly adapted for the direct roll coating of substrates. The composition comprises (1) an aqueous solution or colloidal solution of a volatile amine or ammonia salt of a high molecular weight carboxylic acid-containing acrylic copolymer, (2) a carboxylic acid-containing acrylic oligomer in the solution, and (3) an aqueous dispersion or solution of a crosslinker; the volatile aqueous phase being by volume 70 to 95% water and 5 to 30% organic solvents, the solids content 15 to 70% by weight and the viscosity between 25 and 150 seconds measured in the number 4 Ford cup.

20 Claims, No Drawings

AQUEOUS COATING COMPOSITIONS COMPRISING ACRYLIC OLIGOMERS, HIGH MOLECULAR WEIGHT POLYMERS AND CROSSLINKERS

This invention concerns thermosetting coating compositions which are applied from aqueous media to the surfaces to be coated. These compositions are useful in high-speed direct roll coating operations, as in metal decorating, as well as lower-speed direct and reverse roll coating and other means for applying coatings. The coating compositions are excellent in flow, leveling and transfer from rolls to substrate and produce coatings high in gloss, mar resistance, hot stacking resistance and resistance to deterioration or extraction under pasteurization conditions.

By "metal decorating" is meant coating a metal sheet with a suitable coating composition and then subjecting the sheet to various mechanical forming processes. Examples of metal decorated items which are in common use are beer cans, beverage cans, vegetable cans, screw caps for jars and aerosol containers. The coatings for such items must be able to withstand a variety of fabrication treatments without cracking or chipping of the coating. These fabrication treatments range from very mild treatments (e.g., the formation of can bodies) to extremely severe (e.g., the fabrication of aerosol domes). Of course, the compositions can also be applied to previously shaped articles such as mandrel-formed two piece can bodies, toothpaste tubes, etc.

In a typical process for the formation of a finished metal decorated item, a pigmented base white coating composition is roller coated onto a metallic substrate and the coated substrate is subjected to a baking operation. A decorative printing is then applied over the base white coat, and while the ink is still wet, a clear overprint varnish is roller coated over the ink to protect it. The coated metallic sheet is then subjected to a baking operation to develop final hardness. The finished coated metal sheets may then be stacked and stored for various time periods prior to fabricating into the final product. It is essential that the coating have good hot stack resistance to prevent the metal sheets from adhering one to another since this results in marring of the coatings. The coated sheets are finally fabricated into various forms. The fabrication requirements will vary depending upon the end use of the material, e.g., whether it is to be fabricated into cans, lids, screw caps, etc. In addition to withstanding the various fabricating operations performed on the metal, many end uses require processing or sterilization operations which involve high temperature conditions. In such instances, the coating must possess good overbake properties.

In order to obtain maximum hot stacking properties for coatings, it is desirable to use a thermosetting coating composition which results in a high degree of crosslinking when cured. However, the cured coating must also possess sufficient flexibility to permit the fabrication treatment to which it will be subjected. If the coated metal is to be subjected to severe fabricating operations, a "soft" thermosetting resin should be used; whereas, if the coated metal is to be subjected to relatively mild fabricating conditions, a "hard" thermosetting resin may be employed.

Heretofore, metal decorating has involved the application of coatings comprising optionally corrosion-protective pigments in non-aqueous vehicles based on a drying oil, such as linseed oil, a fast-drying varnish base comprising natural resins, a mixture of natural and synthetic resins, or an alkyd base modified with a urea-, melamine-, or phenol-formaldehyde resin. Such coating compositions are usually supplied in high-boiling solvents to insure good flow and leveling in the thin films applied during a roller coating operation. The solvents are frequently of an inflammable character and often are the type which give off noxious fumes during the coating operation. To cope with the fire and health hazards, protection is usually provided by way of solvent recovery systems. Moreover, recent interest in air pollution control has been aimed at reducing or eliminating organic solvent emission to the atmosphere.

There has long been a demand for thermosetting coating compositions which can be applied from an aqueous medium to avoid air pollution, fire hazards and other problems which attend the use of organic solvent coating compositions. However, earlier aqueous coating systems, such as shown in U.S. Pat. Nos. 2,760,886 to Prentiss et al; 2,918,391 to Hornibrook et al; 3,033,811 to Brown et al; and 3,845,066 to Vasta have not proved fully satisfactory for coating metals for uses according to the present invention by direct roller coating machinery. Many tend to dry on the roller, causing difficulties in cleanup, or blister when the wet products are put directly in an oven, or are deficient in final properties such as humidity resistance and durability, or are not amenable to post-forming operations because of brittleness or to handling because of softness. The greatest difficulty with water-based systems is to obtain rheological properties suitable for high-speed direct roll coating of the system.

It is frequently observed that ripples in the form of standing waves form in the coating composition layer on the roll coater rolls. These ripples often result in a pattern being transferred to the substrate, resulting in lack of surface smoothness or so-called "internal flow" lines in the coating on the substrate. Those skilled in the art recognize that an interplay of forces involving the coatings composition, such as surface tension, wetting of the rolls and substrate, and flow under high shear forces during application and low shear forces during leveling after application, play a role in achieving well-coated, attractive finished products. The flow of the composition under these conditions is likely to entail elastic phenomena and time-dependant phenomena which are not well understood. For practical use, a composition is required which possesses flow and leveling properties such that when applied by a direct roll coater, it will form a uniform and smooth surface which is free of striations. The deficiency of aqueous emulsions from the standpoint of flow and leveling is well-recognized in the metal coating industry; see *Paint and Varnish Production*, February 1964, pages 28–33. The flow and leveling of the pigmented base coat is most critical since pigmentation noticeably reduces flow in aqueous systems.

Other binder systems such as water-reducible polyesters, acrylics and alkyds are difficult to formulate with acceptable flow and leveling and, simultaneously, conform with the County of Los Angeles, California Rule 66 — solvent limitations, i.e., less than 20% by volume of exempt organic solvent. With these binders, there is also encountered storage stability problems due to hydrolysis of the binder. Colloidal dispersion polymers, colloidal solution polymers and polymer emulsions often exhibit poor flow and rapid drying on the rolls. It is difficult to control the viscosity of the systems, often limiting their usage to slow-speed roll coating lines. The present invention overcomes these objections and, indeed, it is comparatively easy to formulate into paints, either clear or pigmented, with excellent properties and amenable to coating by high-speed direct roll coating.

In lubricating oil technology, it is well-known that marked improvements in rheological properties are obtained by blending high molecular weight materials with low molecular weight materials. In the absence of any theoretical construct or explanation for the factors involved in coating transfer from the rolls and flow and leveling, it is difficult to say whether an analogy exists between these lubricating oil systems and the current invention. In any case, it is clear that the blend of high molecular weight and low molecular weight binder components, of the present invention, also produces an exceptional jump in desirable rheological properties. One may speculate that the critical stage for leveling occurs when most of the volatile components have left the film and the leveling is controlled by the amount of flow of the binder system before appreciable crosslinking has taken place.

The compositions of this invention are pigmented and unpigmented thermosettable composition, adapted for roller coating of substrates, comprising a stable aqueous alkaline blend having a binder consisting essentially of:

(A) a copolymer of (1) 3% to about 30% by weight of an olefinically unsaturated monomer containing a carboxyl group, (2) at least one ester of acrylic and/or methacrylic acid, and, optionally, (3) other vinyl monomers, the total of (1), (2) and (3) being 100%, the weight average molecular weight of the copolymer being between 10,000 and 500,000, in the form of a solution or a colloidal solution in an aqueous blend as a salt of a volatile amine or ammonia;

(B) an oligomeric copolymer of (1) at least one ester of acrylic and/or methacrylic acid, (2) 9% to about 50% of an olefinically unsaturated monomer having at least one carboxyl group, and, optionally, (3) other vinyl monomers, the total of (1), (2) and (3) being 100%, the weight average molecular weight of the copolymer being between 400 and 6000, the molecular weight distribution being such that the heterogeneity index is 3.0 or less, in the form of a solution in the aqueous blend; and (C) a crosslinking agent selected from the group consisting of:

(a) an alcohol-modified aminoplast resin comprising the condensation product of an aldehyde and a compound selected from the group consisting of ureas, polyamides and triazines;

(b) a polyepoxide containing at least two vicepoxy groups in which the epoxy oxygen atom is attached to adjacent carbon atoms;

(c) a polyaziridine containing at least two aziridinyl groups; and (d) a β-hydroxyalkylamide of the formula:

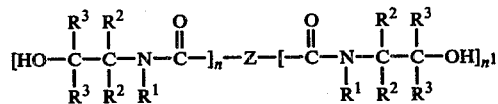

containing at least two β-hydroxyalkylamide groups, wherein

Z is a bond, hydrogen, a monovalent or polyvalent organic radical derived from a saturated or unsaturated alkyl containing from 1 to 60 carbon atoms, aryl, tri-lower alkylene amino or an unsaturated radical;

$R^1$ is hydrogen, lower alkyl or hydroxyalkyl;

$R^2$ and $R^3$ are the same or different radicals selected from hydrogen, straight or branched chain lower alkyl, or one of the $R^2$ and one of the $R^3$ radicals may be joined together with the carbon atoms to which they are attached to form cycloalkyl;

$n$ is an integer of 1 to 2; and $n^1$ is an integer of 0 to 2, and when $n^1$ is 0 and $n$ has a value greater than 1, a polymer or copolymer from the β-hydroxyalkylamide when Z is an unsaturated radical, said agent being in the form of a dispersion or solution in the aqueous blend, in which, on a solids basis, (C) being from 5 to 50 percent by weight, (A) plus (B) being from 95 to 50 percent by weight, with (A) being from 95 to 25 percent and (B) being from 5 to 75 percent by weight of the total of (A) plus (B), and the blend having a volatile aqueous phase comprising 70 to 95 percent by volume of water, and 5 to 30 percent by volume of volatile organic solvent, the composition having between 15 and 70 percent solids by weight, with a viscosity between 25 and 150 seconds measured in the number 4 Ford cup at 25° C.

Stated succinctly, the binder of this invention comprises three components: (A) a high molecular weight copolymer containing carboxyl groups and acrylate and/or methacrylate mers in the form of a solution or a colloidal solution in an aqueous phase, (B) an acid-containing oligomer of narrow molecular weight distribution containing acrylate and/or methacrylate mers in solution in the aqueous phase, and (C) a crosslinker in the form of an aqueous dispersion or solution. The coating composition is stable and has the difficult-to-achieve requisite rheological properties for application by high-speed direct roll coating. The baked coating exhibits high gloss, mar resistance, hot stacking resistance and resistance to degradation under pasteurization conditions.

High Molecular Weight Component

The high molecular weight copolymer component (A) is a solution or colloidal solution of a salt of a volatile amine or ammonia prepared from copolymers containing from about 3% to about 30% by weight of an addition polymerizable ethylenically unsaturated carboxylic acid, particularly acrylic and/or methacrylic acid, at least one ester of such addition polymerizable acid, especially acrylic and/or methacrylic acid, and, optionally, other vinyl monomers. The salt is formed by addition of the amine or ammonia to the polymer in an aqueous medium which may also contain a cosolvent as hereinafter defined. The salts obtained often appear to form colloidal aggregates or micelles when in aqueous solution. Thus, a typical salt obtained in accordance with the present invention has been found to form micelles of about 500 Angstroms diameter (as determined from light-scattering and sedimentation measurements) when dissolved in water. The solutions of the copolymer salts are thus appropriately termed "colloidal solutions." The weight average molecular weight of this component, as measured by calibrated gel permeation chromatography, is 10,000 to 500,000, with the range from 20,000 to 75,000 being preferred.

The colloidal nature of the dissolved polymer in a colloidal solution is indicated clearly by determination of the self-crowding constant, K, for the polymer in the solution as taught by A. Mercurio in "Rheology of Acrylic Paint Resins," *Canadian Paint and Varnish*, September 1964. Spheres suspended in a liquid change the viscosity as given by the Mooney equation:

$$\ln \eta_{rel} = 2.5\phi/1 - K\phi$$

where
ln = natural logarithm;
$\eta_{rel}$ = viscosity of the system divided by that of the pure liquid;
$\phi$ = volume fraction of spheres; and
K = the self-crowding constant.
Mercurio rearranged the Mooney equation to:

$$\frac{1}{\ln \eta_{rel}} = \frac{1}{BC} - \frac{K}{2.5}$$

where the new symbols are:
B = experimental constant, and
C = the concentration of polymer in the liquid;
and evaluated K by extrapolating plots of $1/\ln \eta_{rel}$ vs. $1/C$ to the intercept where $1/C = 0$. This led to the finding that dispersions of spheres, such as polymer emulsions, have values of K in the neighborhood of 1.9, colloidal solutions about 1.0 and simple solutions about zero. Thus, a self-crowding constant of about 1.0 serves as another way of characterizing the colloidal solutions.

The esters of acrylic or methacrylic acid used in preparing the copolymer of component (A) may be represented by

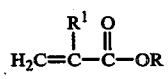

wherein
$R^1$ is H or methyl, and
R is an alkyl group, preferably having 1 to 24 carbon atoms, an alkenyl group, preferably having 2 to 4 carbon atoms, an aminoalkyl group, preferably having 2 to 8 carbon atoms, an alkylaminoalkyl group, preferably having up to 6 carbon atoms, a dialkylaminoalkyl group, preferably having up to 6 carbon atoms, an isocyanatoalkyl group, preferably having 2 to 8 carbon atoms in the alkyl portion, a hydroxyalkyl group, preferably having 2 to 8 carbon atoms, a 3-(1,3-oxazolidinyl)alkyl group, preferably having 2 to 4 carbon atoms in the alkyl portion and optionally having up to two $(C_1-C_4)$alkyl substituents on the oxazolidinyl ring, an allyloxyalkyl group, preferably having up to 12 carbon atoms, an alkoxyalkyl group, preferably having up to 12 carbon atoms, an aryloxyalkyl or aralkoxyalkyl group, preferably having up to 12 carbon atoms, most preferably a phenoxyalkyl, benzyloxyalkyl, substituted phenoxyalkyl, or substituted benzyloxyalkyl group, an aralkyl group, preferably having up to 10 carbon atoms, most preferably a benzyl or substituted benzyl group, or an acryloyloxyalkyl or methacryloyloxyalkyl group, preferably having up to 4 carbon atoms in the alkyl portion, a group of the formula $-A^1N(R^3)CXNR^1R^2$;
wherein $R^3$ is selected from the group consisting of H, alkyl groups having 1 to 4 carbon atoms, hydroxyalkyl groups having 1 to 4 carbon atoms, and alkoxymethyl groups having 2 to 5 carbon atoms;
$A^1$ is an alkylene group having 2 to 8 carbon atoms;
$R^1$, when not directly attached to $R^1$, is H, phenyl, methylbenzyl, benzyl, cyclohexyl, alkyl having 1 to 6 carbon atoms, hydroxyalkyl having 1 to 6 carbon atoms or N-alkoxyalkyl having 2 to 6 carbon atoms;
$R^2$, when not directly attached to $R^1$, is H, phenyl, methylbenzyl, benzyl, cyclohexyl or alkyl having 1 to 6 carbon atoms;
$R^1$ and $R^2$, when directly connected together, is the morpholino residue $-C_2H_4OC_2H_4-$, the piperidino residue $-(CH_2)_5-$, or the pyrrolidino residue $-(CH_2)_4-$; and
X is selected from the group consisting of oxygen and sulfur,
or polymerizable monoethylenically unsaturated molecules containing a cyclic ureido group of the formula:

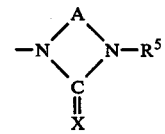

wherein
A is an alkylene group having 2 to 3 carbon atoms;
$R^5$ is selected from the group consisting of H, $-CH_2OH$ and $-CH_2OCH_3$; and
X is selected from the group consisting of oxygen and sulfur.

Examples of these acrylic and methacrylic ester monomers are: methyl methacrylate, ethyl methacrylate, n-butyl methacrylate, isobutyl methacrylate, t-butyl methacrylate, hexyl methacrylates, lauryl methacrylate, stearyl methacrylate, cyclohexyl methacrylate, dimethylaminoethyl methacrylate, t-butylaminoethyl methacrylate, 2-hydroxyethyl methacrylate, ethyl 2-hydroxymethylacrylate, 2-hydroxypropyl methacrylate, oxazolidinylethyl methacrylate, allyloxyethyl methacrylate, allyl methacrylate, allyloxyethoxyethyl methacrylate, isopropyloxazolidinylethyl methacrylate, isopropylidene glyceryl methacrylate, γ-ketiminopropyl methacrylate, methyl acrylate, ethyl acrylate, propyl, isopropyl and cyclopropyl acrylates, isobutyl, t-butyl, butyl and cyclobutyl acrylates, pentyl and cyclopentyl acrylates, hexyl and cyclohexyl acrylates, heptyl and cycloheptyl acrylates, octyl acrylates, including 2-ethylhexyl acrylate, nonyl acrylates, decyl acrylates, undecyl acrylates, lauryl acrylate, myristyl acrylate, cetyl acrylate, stearyl acrylate, phenylethyl acrylate, phenylpropyl acrylates, allyl acrylate, dimethylaminoethyl acrylate, t-butylaminoethyl acrylate, dimethylaminobutyl acrylates, diethylaminoethyl acrylate, morpholinoalkyl acrylates, oxazolidinylalkyl acrylates, piperidinoalkyl acrylates, ketiminoalkyl acrylates, methoxyethyl acrylate, ethoxyethyl acrylate, butoxyethyl acrylates, hexyloxypropyl acrylates, ethoxypropyl acrylates, propoxybutyl acrylates, hexyloxyhexyl acrylates, phenoxyethyl acrylates, benzyloxyethyl acrylates, allyloxyethyl acrylate, allyloxyethoxyethyl acrylate, allyloxypropyl acrylate, β-thioureidoethyl methacrylate, N-methyl-N'-β-methacryloxyethyl-urea, N-(β-methacryloxypropyl)-N-methylol-N,N'-propyleneurea, β-ureidoethyl acrylate, N-methylol-N'-methylol-N'-β- acryloxyethylurea, N-(β-acryloxyethyl)-N,N'-ethyleneurea, N-(β-acryloxyethyl)-N-methoxymethyl-N,N'-ethyleneurea, N-(β-acryloxyethyl)-N-methylol-N,N'-ethylenethiourea, N-(3-acryloxypropyl)-N,N'-trimethyleneurea, N-[β-(α-acryloxyacetamide)ethyl]-N,N'-ethyleneurea, N-[β-(β-acryloxyacetamido)ethyl]-N-methylol-N,N'-ethyleneurea, N-[β-(α-methacryloxyacetamido)ethyl]-N,N'-ethyleneurea, N-[β-(α-methacryloxyacetamido)ethyl]-N-methylol-N,N'-ethylenethiourea, N-[β-(α-methacryloxyacetamido)propyl]-N,N'-propyleneurea, N-[β-(α-acryloxyacetamido)propyl]-N,N'-trimethyleneurea, and N-[β-(α-methacryloxyacetamido)ethyl]-N-methylol-N,N'-ethyleneurea.

The preferred esters are the $C_1$ to $C_{12}$ alkyl esters, preferably $C_1$ to $C_8$, with the lower ones, $C_1$ to $C_4$, being most preferred.

Examples of the olefinically unsaturated monomers containing a carboxyl group used in the copolymer of component (A) are: sorbic, cinnamic, vinyl furoic, α-chlorosorbic, p-vinylbenzoic, acrylic, methacrylic, maleic, fumaric, aconitic, atropic, crotonic and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate and butyl acid maleate.

Other vinyl monomers used in the copolymer of component (A) are monomers comprising at least one of the following groups:
vinylidene $CH_2=C<$,
vinyl $CH_2=CH-$, and
vinylene $-CH=CH-$.
Examples are the α,β-ethylenically unsaturated monocarboxylic acid amides such as monomers of the formula

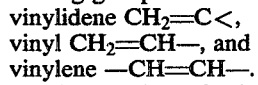

wherein
R is H or methyl; and
Y is an amino, a ($C_1$–$C_4$)alkylamino, a di($C_1$–$C_4$)alkylamino, a hydroxy($C_1$–$C_4$)alkylamino, a bis-hydroxy($C_1$–$C_4$)alkylamino, a ($C_1$–$C_4$)alkoxy($C_1$–$C_4$)-alkylamino or a bis-($C_1$–$C_4$)alkoxy($C_1$–$C_4$)alkylamino, α,β-ethylenically unsaturated aldehydes, α,β-ethylenically unsaturated dicarboxylic acid esters, amides, half esters and half amides thereof, α,β-ethylenically unsaturated nitriles, hydrocarbons such as vinylaryl compounds, vinyl halides, vinly acyloxy compounds (esters of saturated carboxylic acids and ethylenically unsaturated alkanols), vinyl amines and salts thereof, vinyl ureido monomers, vinyl compounds having heterocyclic nitrogen-containing (NH<) groups, and halogen, hydroxyalkyl or aminoalkyl substituted derivatives thereof, whether homo-oligomers or co-oligomers.

Specific examples of vinyl monomers which may be used in component A) according to the invention are: acrolein, methacrolein, ethylene, propylene, isobutene, butadiene, isoprene, chloroprene, styrene, α-methyl styrene, vinyl toluene, vinyl chloride, vinyl bromide, vinyl acetate, vinyl propionate, the vinyl pyridines, acrylonitrile, vinyl pyrrolidone, vinylidene chloride, amino compounds such as β-aminoethyl vinyl ether, aminopentyl vinyl ether, ureido monomers such as β-(N,N'-ethyleneureido)ethyl acid maleate, β-ureidoethyl vinyl ether, N-vinyl-N,N'-ethyleneurea, N-vinyloxyethyl-N,N'-ethyleneurea, N-dimethylaminoethyl-N'-vinyl-N,N'-ethyleneurea, N-hydroxyethylacrylamide, N-methylolacrylamide and N-(dimethylaminoethyl)acrylamide. Of these, the vinyl aromatic monomers, especially styrene, α-methyl styrene and vinyl toluene, are preferred.

Oligomer Component

The oligomeric copolymer of component (B) may be prepared by any of several known methods. The preferred preparations are by anionic polymerization initiated by an alkoxide ion catalyst and in the presence of a chain regulating alcohol. These preparations are taught in U.S. patent applications Ser. No. 371,921, filed June 20, 1973 and Ser. No. 241,177 filed Apr. 5, 1972 both now abandoned, both of Sheldon N. Lewis et al, having the same assignee as the present application, the disclosures of which are incorporated herein by reference Ser. No. 517,337, filed Oct. 23, 1974 and U.S. Pat. No. 4,056,559 issued Nov. 1, 1977 are continuations-in-part of Ser. No. 371,921, hereinabove, and Ser. No. 629,186 is a continuation-in-part of Ser. No. 241,177, hereinabove also teaching these preparations.

Other known methods of producing low molecular weight polymers may be utilized such as the use of a high proportion of a free radical catalyst, the use of a high polymerization temperature, the use of a chain transfer agent, or all of these together. Among the chain transfer agents are carbon tetrabromide, allyl chloride, thio-β-naphthol, thiophenol, butylmercaptan, ethylthioglycolate, mercaptoethanol, isopropylmercaptan, and t-butylmercaptan. When free radical catalysts are utilized, the concentration can be increased to a point where the molecular weight is reduced substantially, particularly with high reaction temperatures. For example, utilizing benzoyl peroxide or di-t-butyl peroxide in amounts of from 0.5 mole percent to 5 mole percent based on monomer, along with a solvent such as isopropyl benzene, and utilizing reaction temperatures of 110° to 250° C. gives low molecular weight polymers. The polymerization can be solution, bulk, emulsion, or a nonaqueous dispersion. In addition to the anionic polymerization and free radical polymerization processes, cationic polymerization may be conducted at high temperatures or in the presence of high levels of initiators or chain transfer agents. Degradative processes may be used to produce the oligomers from high polymers such as by mastication, photochemically induced degradation, oxidation, bombardment with high energy radiation such as x-rays, gamma rays, and high energy electrons. In cases where the products have a wide molecular weight distribution, it may be necessary to obtain the preferred narrow molecular weight distribution, corresponding to a ratio of weight average to number average molecular weight of 1.5 or less, by vacuum distillation, zone refining, selective precipitation, selective crystallization, solvent extraction, or other known methods. It is, of course, much preferred to use a process which initially gives the narrow distribution of molecular weights such as illustrated in the Lewis et al patent applications noted above.

The monomers useful and preferred for the preparation of the oligomers of component B) are the same as those discussed above for the preparation of the higher molecular weight copolymers of component A). The acid groups in the copolymer are either introduced by means of acid monomers or produced by hydrolysis of ester units in the oligomer, the latter is the method of preference.

The weight average molecular weight, measured by calibrated gel permeation chromotography, of the oligomer component is 400 to 6000 with the range 500 to 2500 being preferred. The heterogeneity index, the ratio of the weight average molecular weight to the number average molecular weight, is three or less with the low range, corresponding to less than 1.5, being particularly preferred. Also preferred is a weight distribution so narrow that 80% by weight of the oligomer molecules have a chain length in the range from about $\bar{n}/3$ to about $3.3\ \bar{n}$; wherein $\bar{n}$ is the average number of mers in the polymer chain.

Crosslinking Agent

Aqueous solutions or dispersions of the component C) crosslinking agents reactive with the carboxyl groups of the high molecular weight polymer and the oligomer are used to produce the highly crosslinked thermoset clear or pigmented coatings of this invention. The preferred crosslinking agent is an alcohol-modified aminoplast resin. Other utilizable crosslinkers are polyepoxides having at least two vic-epoxy groups, polyaziridines having at least two aziridinyl groups and poly($\beta$-hydroxyalkylamides) having at least two $\beta$-hydroxyalkylamide groups, particularly the $\beta$-hydroxyethylamide groups.

The alcohol-modified aminoplast resins, water-soluble, heat-convertible condensation products of a urea, a polyamide or a triazine (e.g. melamine) with formaldehyde and/or their derivatives obtained by reaction with ethanol or methanol, can be prepared according to one of the following schemes: (1) control of reaction conditions so that the degree of polymerization is kept very low, even to the monomeric stage, and (2) introduction of hydrophilic groups into the molecules of the polymeric condensates. Thus, they can be made by careful control of reaction conditions as set forth in Schildknecht, "Polymer Processes," Vol. X, page 295 et seq. (Interscience Press, 1956). The preparation of another class of compounds suitable in the present invention, such as N,N'-bis(methoxymethyl)urea is set forth in Bull. Chem. Soc. Japan, Vol. XI, No. 3,239 (1936). In a preferred embodiment of this invention, the crosslinking agent is a substantially monomeric alcohol-modified condensation product of formaldehyde and melamine with hexamethoxymethylmelamine and pentamethoxymethylmelamines being most preferential.

The polyepoxide crosslinker may consist of any water-soluble or easily water-dispersible aliphatic diglycidyl ether within the scope of Formula I hereinbelow, such as ethylene glycol diglycidyl ether, propylene glycol diglycidyl ether, and trimethylene glycol diglycidyl ether. Related water-soluble or readily water-dispersible glycidyl ethers that may be used are the polyglycidyl ethers of polyhydric alcohols having two to four carbon atoms, such as ethylene glycol, glycerol, trimethylene glycol, propylene glycol, butylene glycols, their dimers, trimers, and higher polymers especially the water-soluble or water-dispersible glycidyl ethers having the structure of one of Formulas I, II, and III.

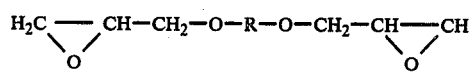

wherein R is an alkylene group of from two to six carbon atoms;

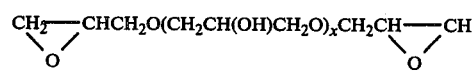

where $x$ is a number having an average value of one to three;

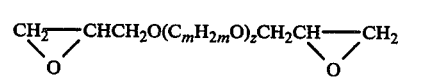

where $m$ is an integer having a value of two to four, and $z$ is a number having an average value of one to five. All of these polyepoxides contain at least two vic-epoxy groups in which the epoxy oxygen atom is attached to adjacent carbon atoms.

As the polyepoxides may be obtained by reactions involving condensation and elimination of water, they may all be termed "condensates," and for convenience of reference hereinafter are so termed.

Either epoxy condensates which are soluble in water or water-dispersible epoxy condensates may be used. A dispersing agent such as an octylphenoxypolyethoxyethanol may be employed to aid in the dispersion of the latter type of condensates. Instead their solubility in aqueous systems may be improved sufficiently by the addition of a lower alcohol, such as ethanol, isopropanol, and the like.

The water-insoluble copolymer is maintained in dispersed condition in the aqueous medium by a dispersing agent or emulsifying agent generally of anionic or nonionic character.

Other polyepoxides which may be used are the condensates of bisphenol A

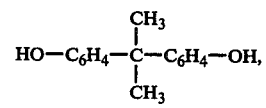

and epichlorhydrin,

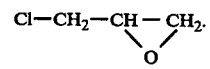

The following table characterizes a number of these condensates.

| Melting point, °C (Durrans) | Color, 25° C (Gardner) | Epoxide equivalent | Average molecular weight | Viscosity 25° C, centipoises or Gardner-Holdt[1] |
|---|---|---|---|---|
| Liquid | 8(max) | 175–210 | 350–400 | 4,000–10,000 |
| Liquid | 12(max) | 175–210 | 350–400 | 5,000–15,000 |
| Liquid | 10(max) | 225–290 | 450 | $A_2$–$A_1$ |
| 40–50 | 8(max) | 300–375 | 700 | $A_1$–B |
| 64–76 | 8(max) | 450–525 | 900–1,000 | C–G |
| 95–105 | 6(max) | 870–1,025 | 1,400 | Q–U |
| 125–132 | 8(max) | 1,650–2,050 | 2,900 | Y–$Z_1$ |

-continued

| Melting point, °C (Durrans) | Color, 25° C (Gardner) | Epoxide equivalent | Average molecular weight | Viscosity 25° C, centipoises or Gardner-Holdt[1] |
|---|---|---|---|---|
| 145-155 | 11(max) | 2,400-4,000 | 3,800 | $Z_2$-$Z_5$ |

[1] In 40 percent butyl Carbitol.

Still other usable polyepoxides are those made by the epoxidation of unsaturated fats and oils. Preferred members of this class are the soybean oil epoxides.

Polyaziridines useful as crosslinking agents include the trialkylene phosphoramides and the tripropylene thiophosphoramides such as tripropylene thiophosphoramide, tripropylene phosphoramide, the bis(N,N'-diethylene phosphoramides) such as n-butyl-, allyl-, cyclohexyl-, benzyl-, ethyl- and n-hexyl-iminobis[bis(1-aziridinyl)phosphine]oxide, the diethylenimino- and dipropyleniminophosphate esters of small glycols such as diethylene glycol, aziridine-terminated polyglycols of the formula

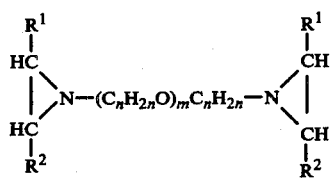

wherein
n is an integer of 2 to 4,
m is between 1 and 50, and
$R^1$ and $R^2$ are hydrogen or ($C_1$-$C_4$)alkyl groups, such as,

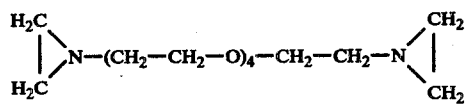

and compositions of the formula

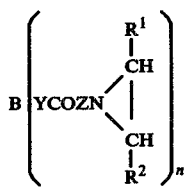

wherein
$R^1$ and $R^2$ have the significance indicated above,
n is an integer of 2 to 6,
Z is a ($C_2$-$C_6$)alkylene group,
B is alkyl, aryl, aralkyl, cycloaliphatic, heterocyclic or a poly(alkylene ether) of one to fifty units, and
Y is oxygen, sulfur, nitrogen or an -NH- group, such as

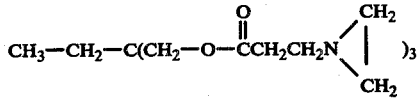

Other water-soluble or water-dispersible polyaziridines are well-known in the art; a number are given in the Belgian Pat. No. 804,135, opened for public inspection Feb. 28, 1974.

The β-hydroxyalkylamide crosslinkers are taught in U.S. patent application Ser. No. 454,645 filed Mar. 25, 1974, of Graham Swift et al., having the same assignee as the present application, herein incorporated by reference.

The coating compositions of the present invention may be employed as clears, i.e., non-pigmented clear top coatings, or as pigmented coatings. If pigmented, the ratio of pigments to coating solids may be varied widely, depending on the pigment employed and the specific application involved. Thus, the ratio of pigment to coating solids may vary from 1 to 20 to 20 to 1. As clear coatings, the compositions will usually be formulated between 15 and 60 percent solids by weight; pigmented formulations will be between 30 and 70 percent by weight. The clears are particularly useful as "overcoats," i.e., the so-called overprint coatings which are used to protect decorative undercoats without detracting from the decorative effect. Because the clear coatings of the present invention exhibit good clarity, high gloss, excellent solvent- and water-resistance, and high adhesion to a variety of surfaces, they are admirably suited for use as overprint finishes.

Although the coating compositions of this invention are of particular utility for metal decorating, they can be applied to a variety of substrates, the only restriction being the ability of the substrate to withstand the baking cycle which is essential in the processing of said coating compositions. Metals are particularly suitable, whether prime-coated or unprimed. Thus, iron, steel, chrome-plated steel, tin-plated steel, aluminum, copper, bronze or brass surfaces, particularly in sheet or coil form with thicknesses of 0.05 to 0.20 inches, prove to be excellent as substrates for the coating compositions of the present invention. Ceramic surfaces and, in some instances, wood surfaces, are also suitable as substrates. For roller coating such as reverse roll coating, the coating is from 0.05 to 5 mils in thickness, preferably 0.2 to 1.5 mils in thickness when not cured.

A wide variety of pigments can be employed with the coating compositions of the present invention. Typical pigments which are suitable include titanium dioxide, iron oxide, calcium carbonate, barytes and numerous types of clays.

The coating compositions of this invention are particularly suitable for application by a direct roll coater, although they may be applied by other means such as a reverse roll coater or a spray gun. The coatings are then baked at a temperature of from about 250° F. to 350° F. for from about ½ to 10 minutes. The baking or curing operation volatilizes the volatile material in the film including any remaining water, traces of monomer, coalescents and the tertiary amine. In aminoplast cross-linked systems, it is particularly important that the tertiary amine be volatilized since it inhibits the cure of the aminoplast. The baking operation effects the decomposition of the ammonium or amine salts of the polymeric carboxylic acids, apparently releasing the acid form of the copolymer which may then react with the other components to become insoluble. The baking operation causes the crosslinker to react with the oligomer and the polymer to crosslink and insolubilize the entire film.

Certain monomers are known to contribute toughness to films. These include the monovinyl aromatic monomers, acid monomers, monomers having hydroxyl and/or amide functionality. The olefinically unsaturated monomer containing a carboxyl group may be a simple monocarboxylic acid, or it may be a half ester of half amide of an α,β-unsaturated dicarboxylic acid and salts thereof with a volatile base, such as ammonia, or volatile water-soluble amine, such as dimethylamine, dimethylethanolamine, triethylamine, triethanolamine, morpholine, n-methyl morpholine, picoline and the like. The coating composition described may be used as clear top coatings or may be pigmented with a variety of pigments. It may contain materials designated as coalescents, but these are generally not necessary in the compositions of this invention. Rheology modifiers may also be used with or as part of these compositions, but again they are generally unnecessary. It is well-known that the introduction of coalescents or rheology modifiers often results in the loss of or downgrading of certain of the desirable properties of coatings. It is one of the great advantages of the instant invention that these materials are rendered unnecessary. This produces considerable simplification for the formulator and improvement in the film properties by the elimination of materials which do not contribute to the binder but, generally, act as diluents in the binder component.

The preferred composition uses an aminoplast. In view of this, since aminoplasts are reactive under strongly acidic conditions, the mixture must not be allowed to be strongly acidic if it is to have appreciable storage life. A volatile base, such as ammonia or a tertiary amine, preferably dimethylaminoethanol, is used to make the system alkaline, because tertiary amines will not react with the formaldehyde associated with the aminoplast. The tertiary amine also functions as a corrosion inhibitor when the coating composition is used for coating metals. The amine must be sufficiently volatile so that substantially all of it will be driven from the film during the baking operation. However, it must not be so volatile that it flashes from the film or gasifies if the coating composition is applied by spraying. Aminoplast systems brought to a high pH with ammonia alone tend to have short storage stability; however, if tertiary amines are the predominant nitrogen base present, small amounts of ammonia are tolerated without deleterious effects.

An optional component is a dispersant for dispersing the pigment. Again, this is a component which may have deleterious effects on the properties of the final film, particularly the water resistance property. It is another advantage of the instant invention that the use of a dispersant is not essential in these systems.

In formulating the binder of this invention, the kind and amount of crosslinker chosen are based on the coating properties desired. For high hardness, high resistance to stain and solvents, a high level of crosslinker is desired; for flexibility, a low level. The useful level of crosslinker is 5% to 50% of the binder solids by weight, with the range 15% to 40% being preferred. The remaining 50% to 95% of the binder is a blend of the oligomer and the high molecular weight colloidal solution polymer with the oligomer being 5% to 75% by weight of this remainder, with 25% to 50% being preferred, and the high molecular weight component being 95% to 25% of this remainder, with 75% to 50% being preferred. The number 4 Ford cup viscosity, American Society for Testing Materials method D-1200-58, of the finished coatings compositions is in the range 25 to 150 seconds, with 40 to 100 seconds being preferred. The volatiles in the coating compositions are 70% to 95% water by volume, and 5% to 30% organic solvents, with the preferred range being 80% to 95% water and 5% to 20% organic solvents. The solvents used are generally those recognized as "strong" solvents and include the lower alcohols, such as the propyl, butyl and pentyl alcohols, the ketones, such as methyl ethyl ketone, the methyl butyl ketones and the methyl propyl ketones, the lower alkoxy ethanol solvents, such as the propyl and butyl Cellosolve (Union Carbide) materials.

This application discloses unclaimed subject matter of a prior invention, claimed in application Ser. No. 656,928, filed Feb. 10, 1976, entitled "Aqueous Coating Compositions Comprising Acrylic Oligomers and High Molecular Polymers", by the same inventors. This lubricant coating consists essentially of a blend of the high molecular weight colloidal solution and the oligomer of the instant application.

The following examples, in which the parts and percentages are by weight and viscosities are measured by the Brookfield Viscometer unless otherwise indicated, are illustrative of the invention but are not intended to limit it in any way.

Examples of the high molecular weight component A) are:

EXAMPLE A1

(a) Preparation of Acidic Polymer in Solution

A monomer mixture is prepared by combining the following materials:

|  | Grams |
| --- | --- |
| Ethyl acrylate | 215 |
| Methyl methacrylate | 215 |
| β-Hydroxyethyl methacrylate | 55 |
| Methacrylic acid | 15 |
| 2-Ethoxyethanol | 108 |

To a glass reaction vessel equipped with a reflux condenser, a Teflon paddle, and a dropping funnel and thermometer, there is charged 1390 grams of 2-ethoxyethanol. The contents of the flask are heated to a temperature of 75° C. by means of a water bath, and 3.75 grams of azodiisobutytronitrile (AIBN) are added to the 2-ethoxyethanol immediately prior to the addition of one-quarter of the monomer mix, which amount is added over a period of about five minutes. With the batch temperature maintained at 75° ± 5° C. throughout, a second quarter of the monomer mix is added after 30 minutes; a third quarter after 60 minutes; and a fourth quarter after 90 minutes; with each addition requiring about five minutes. The batch tempertaure is maintained at 75° C. for an additional period of from 3 to 15 hours, with 1.9 grams of AIBN added 2 hours after the start of the monomer addition and 0.85 grams of AIBN added two hours later. The batch is cooled and passed through cheese cloth to remove any insoluble residues. Conversion to polymer is given by a solids analysis, which indicates that polymer has been formed in conversions of 99% or better.

(b) Isolation of Solution Polymer

The 25% concentrate of polymer in 2-ethoxyethanol obtained from Example 1(a) is diluted to 12.5% (although the exact dilution is not critical) with 2-ethoxyethanol or methanol. A five-gallon bucket is about half filled with an equal mixture of water and ice, and the mixture is agitated. The polymer solution is slowly added to the agitated ice-water mixture. An immediate precipitate forms. About one gallon of the polymer solution can be precipitated in this way. The ice-water mix is allowed to warm to room temperature and the precipitated polymer removed by filtration through a Buchner funnel fitted with coarse filter paper. Two to four successive washings with cold water remove all traces of solvent. The polymer is air-dried.

(c) Solubilization of the Isolated Polymer

The polymer isolated as in (b) is solubilized in the following way. To a suitable digestion flask is charged the following:

|  | Grams |
|---|---|
| Polymer | 100 |
| Water | 400 |
| Tert-butanol | 25 |
| Dimethylaminoethanol (1.5 equivalents) | 4.6 |

This mixture is well mixed and digested at 70°–80° C. for a period of several hours. The resultant solution is clear.

EXAMPLE A2

(a) Preparation of the Acidic Polymer as an Aqueous Latex

A monomer mix is prepared from the following materials:

|  | Grams |
|---|---|
| Ethyl acrylate | 460 |
| Methyl methacrylate | 460 |
| β-Hydroxypropyl methacrylate | 50 |
| Methacrylic acid | 30 |
| $CBrCl_3$ | 2.5 |

To a glass reaction vessel equipped with reflux condenser, Teflon paddle, and an addition funnel and thermometer is charged:

|  | Grams |
|---|---|
| Water | 1708 |
| 10% aqueous solution of the dimethylamino-ethanol-solubilized polymer of Example A1 (c) | 200 |

The charge to the flask is heated to 95° C. by means of a steam bath, and the monomer mix is added uniformly over a period of 30 to 45 minutes while, simultaneously and proportionately, a solution of 1.88 grams of ammonium persulfate in 100 ml. of water is added from a burette. During the simultaneous addition of monomer mix and initiator solution, the batch temperature is maintained above 90° C., and agitation is maintained at a fairly rapid rate (i.e., 100–400 r.p.m.). Heating is continued for one-half hour after the monomer addition is complete, and the batch is then cooled to room temperature for storage, or to 50° C. if solubilization is to be carried out immediately. The polymer latex, 33% polymer, is a white, opaque, smooth product with a viscosity of 10 to 20 cps. It is very stable.

(b) Solubilization

Separate 90-gram portions of the final polymer latex of part (a) is solubilized by mixing the 90-gram amount of latex obtained in part (a) with 1.0 gram of dimethylaminoethanol in $x$ grams of a water:cosolvent blend of $(100-y):y$ weight ratio and maintaining the mixture at 55° C. for 2 hours, the cosolvent and $x$ and $y$ being in the respective instances:

|  |  | x | y |
|---|---|---|---|
| 1. | Tert-butanol | 125 | 6 |
| 2. | n-Butanol | 125 | 3 |
| 3. | Isopropanol | 50 | 20 |
| 4. | Isophorone | 100 | 10 |
| 5. | 2-ethylhexanol | 100 | 3 |
| 6. | 2-(butoxy)ethyl acetate | 110 | 5 |
| 7. | 2-(butoxyethoxy)ethyl acetate | 80 | 5 |
| 8. | Triethanolamine | 100 | 3 |
| 9. | 2-butoxyethanol | 50 | 6 |

EXAMPLE A3

Illustrative of another type of aqueous latex, a copolymer is prepared by the emulsion polymerization of a mixture of 50 parts butyl acrylate, 25 parts methyl methacrylate, 10 parts styrene and 15 parts methacrylic acid. The initiator system is 1.5% hydrogen peroxide, 0.75% hydroxylamine and 5 p.p.m. ferrous ion. The emulsifying agent is 0.5% sodium lauryl sulfate. The solids content of the latex is 35.0%, the emulsion has a viscosity of 120 cps. The copolymer has an intrinsic viscosity of 0.14 (in acetone at 30° C.) and a weight average molecular weight of 50,000. Solubilization is carried out as in Example A2 part (b).

EXAMPLE A4

A copolymer latex is prepared as in Example A2 utilizing the following monomer mix:

|  | Grams |
|---|---|
| Ethyl acrylate | 510 |
| Methyl methacrylate | 440 |
| Methacrylic acid | 50 |
| $CBrCl_3$ | 2.5 |

EXAMPLE A5

A copolymer latex is prepared as in Example A3 utilizing the following monomer mixture: 25 parts methyl methacrylate, 10 parts styrene, 35 parts butyl acrylate and 15 parts methacrylic acid.

The following are examples of the oligomeric polymer, component (B):

EXAMPLE B1

Step A — Oligomeric Methyl methacrylate/Butyl methacrylate (75/25 by weight)

To a three-liter, three-necked flask equipped with a condenser, paddle stirrer, thermometer, addition funnel and Y-tube is added, under nitrogen, toluene (60g), n-butanol (22.5 g), sodium methoxide in methanol (25% solution, 29.4 g) and potassium methoxide in methanol (30% solution, 12.7 g). To this clear solution at 60° C. is added, with stirring, methyl methacrylate (310 g) and butyl methacrylate (103 g) over a 30-minute period. The light yellow mixture is maintained at about 61° C. until the reaction mixture exotherms (about 35 minutes after addition). The temperature is maintained at about 65° C. After the exotherm subsides, there is then added over a one-hour period methyl methacrylate (1,067 g) butyl methacrylate (355 g) and toluene (414 g) while maintaining the reaction temperature at 60°–63° C. with ice bath cooling. The product obtained at over 98% conversion, after a ½-hour hold following the second stage addition, is oligomeric methyl methacrylate/butyl methacrylate (75/25) of $\overline{M}_w$ ca. 1450, $\overline{M}_n$ ca. 1300, thus a heterogeneity index of 1.1, measured by calibrated gel permeation chromatography, and is employed in the following step without further purification.

Step B — Oligomeric Methyl methacrylate/Butyl methacrylate Hydrolysis to 25% Methacrylic Acid To the oligomeric methyl methacrylate/butyl methacrylate of part A (1,000 g, 80.1% oligomer) in a three-liter, three-necked flask equipped with a bottom stopcock, reflux condenser, stirrer and thermometer, under a nitrogen atmosphere, at 63° C. is added aqueous sodium hydroxide (185 g, 50.3%). The reaction mixture is held at 73°–78° C. for 1 hour and then heated to reflux for 4.5 hours. Titration discloses 84% conversion at this point. The yellow viscous oil is cooled and diluted with water (200 g) and toluene (200 g). A heterogeneous distillate (400 g) is removed over a 1½ hour period. To the remaining clear yellow-orange solution is added toluene (200 g) and the mixture refluxed for 5½ hours. At this time, toluene (200 g), isobutanol (100 g) and water (710 g) are added and the reaction mixture cooled to 50°–60° C. Sulfuric acid (179 g, 97%) is added over 15 minutes with cooling. The reaction mixture becomes a white, mobile, two-phased mixture and is agitated an additional 15-20 minutes. After removing the aqueous layer, additional water (700 g) is added and the reaction mixture heated at 60°–70° C. with sufficient vacuum to remove the toluene. The pressure is adjusted to atmospheric pressure after collecting about 400 g of distillate while increasing the temperature to 100° C. To the remaining white, two-phased, soft-gum mixture at 90° C. is added dimethylaminoethanol (222 g) and butyl Cellosolve (464 g). After two-thirds of the dimethylaminoethanol (DMAE) is added, solubilization occurs. The solution is cooled to 60°–65° C. and the remaining DMAE added. The product solution is clear and pale yellow (APHA color ca. <250); solids are 60%; pH ca. 9.3; viscosity at 25° C. is ca. 4,000 cps and product acid number is ca. 160 (at 100% solids) indicating a copolymer containing 25% methacrylic acid units.

To calculate the average molecular weights of the hydrolyzed polymer the final step is to obtain the average molecular weight (M.W.) of the mers in the unhydrolyzed copolymer. This is 0.75 × M.W. of methyl methacrylate plus 0.25 × M.W. of butyl methacrylate, in numbers, 0.75 × 100 + 0.25 × 142 = 110.5. Since methacrylic acid has a molecular weight of 86, hydrolysis of 25% of the acid units produces a new average molecular weight of about 0.25 × 86 + 0.75 × 110.5 = 104.5. To convert the $\overline{M}_w$ and $\overline{M}_n$ of the unhydrolyzed polymer to that of the hydrolyzed polymer these are multiplied by the ratio 104.5/110.5. Thus for the hydrolyzed polymer the $\overline{M}_w$ is ca. 1370 and $\overline{M}_n$ is ca. 1230.

EXAMPLE B2

Step A — Oligomeric Methyl methacrylate

To a two-liter, three-necked flask equipped with a stirrer, thermometer and reflux condenser are added, under a nitrogen blanket, toluene (115 g), methanol (2.4 g), 30% methanolic potassium methoxide (20.2 g) and methyl methacrylate (216 g). The temperature of the reaction mixture rises to 27° C. over a 25-minute period. The mixture is then warmed to 33° C. within 20 minutes, and within another 20 minutes, the temperature reaches 42° C. and required cooling. After 40 minutes, the reaction mixture is warmed to maintain the temperature at about 40° C. After 1½ hours, the reaction temperature is increased to 60° C., at which time a solution of methyl methacrylate (649 g) and toluene (265 g) is added while maintaining the temperature at 60°–62° C. After a 45-minute hold period, conversion exceeds 99%. An aliquot of the reaction mixture (300 g) is treated with concentrated sulfuric acid (1.05 g) and diatomaceous earth (1.5 g) and filtered to afford a clear, light yellow oil at 70.5% solids. Molecular weight determination by gel permeation chromatography discloses $\overline{M}_w$ 1700 and $\overline{M}_n$ 1350-1400, thus a 1.2 to 1.3 heterogeneity index.

Step B — Partially Hydrolyzed Oligomer of Methyl methacrylate

Oligomeric methyl methacrylate (1,200 g) in a two-liter Parr bomb fitted with a sampling tube, pressure gauge, stirrer shaft, pressure release valve and hose connection to a dry ice condenser is added aqueous sodium hydroxide (161 g, 50.9%). The bomb is heated by an oil bath at 130°–135° C. with the vent valve opened for ½ hour. The vent valve is then closed, and the temperature of the reaction mixture is adjusted to 110° C., the pressure is 14 psig. After 2 hours, the heating is discontinued and toluene (120 g) and deionized water (240 g) is added. When the temperature reaches 80° C. and the pressure zero, the stirring is stopped and the bomb opened. The contents are transferred to a three-liter, three-necked flask. To this is added toluene (306 g), water (219 g) and n-butanol (67 g). The reaction mixture is maintained at 55° C. while formic acid (219.7 g, 90%) is added over a 15-minute period. Stirring is maintained for an additional 20 minutes and the phases are separated. To the organic phase, in a three-liter flask, are added water (905 g), butyl Cellosolve (164 g) and DMAE (210 g). This mixture is heated to reflux to remove the organic distillate. The reaction mixture is cooled to 95° C. and treated with additional DMAE (100 g). Stirring is continued for 20 minutes as the solution is cooled to 60° C. The product has the following characteristics: clear and essentially colorless (APHA <100) at 48% solids content; pH 9.3; acid number 115, (100% solids).

EXAMPLES B3 AND B4

Employing the procedures similar to Step B of Example B1, the oligomeric methyl methacrylate/butyl methacrylate copolymer of Example B1, Step A, is hydrolyzed to result in 7% methacrylic acid units in the copolymer, Example B3, and 15% methacrylic acid units in the copolymer, Example B4.

EXAMPLE B5

Following substantially the same procedure as described in Example B1, an equal weight copolymer of methyl methacrylate and butyl methacrylate is prepared having a weight average molecular weight of 1100, a number average molecular weight of 950, thus, a heterogeneity index of 1.16. The copolymer is hydrolyzed to produce 54% methacrylic acid units in the product.

EXAMPLES B6 AND B7

Following substantially the same procedure as described in Example B2, an oligomeric homopolymer of methyl methacrylate is prepared having a weight average molecular weight of 1100 and a heterogeneity index of 1.2. One portion of the oligomer is hydrolyzed to result in 27% methacrylic acid units, Example B6, and another is hydrolyzed to 36% methacrylic acid units, Example B7.

EXAMPLE B8

Following substantially the same procedure as described in Example B2, an oligomeric homopolymer of butyl methacrylate is prepared having a weight average molecular weight of 1110 and a heterogeneity index of 1.16. It is then hydrolyzed to give a product with 34% methacrylic acid units.

EXAMPLE B9

A Free Radical Initiated Oligomer

To a three-liter, three-necked flask (kettle) equipped with a condenser, stirrer, thermometer, addition funnel, and Y-tube is added, under nitrogen, butyl Cellosolve (341.8 g) and t-butyl peracetate, 75% in mineral spirits, (4.7 g). To this kettle charge is added, over a 6-hour period, a gradual addition initiator and, in a separate stream, a monomer mixture while maintaining the kettle temperature in the range of 145°–149° C. The gradual addition initiator consists of t-butyl peracetate, 75% in mineral spirits, (88.8 g) and butyl Cellosolve (1.2 g). The monomer mixture consists of:

|  | Grams |
| --- | --- |
| n-Butyl methacrylate | 280 |
| Methyl methacrylate | 770 |
| Methacrylic acid | 350 |
| 2-Hydroxyethyl mercaptan | 21 |

At the end of the polymerization, residual monomer is minimized by the use of a chaser catalyst. Butyl Cellosolve (510 g) is added to drop the solids to a calculated 65 weight percent; solids found is 66%. The final viscosity of the system is found to be above 100,000 centipoise at 25° C. The weight average molecular weight is approximately 2,000, and the heterogeneity index is about 2.8.

EXAMPLE B10

A Free Radical Initiated Polymer

The process and equipment employed are similar to those used in Example B9. The polymerization is conducted over a 3-hour period with the temperature maintained in the range of 140°–150° C. The kettle charge is butyl Cellosolve (341.8 g), the initiator stream is t-butyl peracetate, 75% in mineral spirits, (65.4 g). The monomer stream consists of:

|  | Grams |
| --- | --- |
| n-Butyl acrylate | 439.6 |
| n-Butyl methacrylate | 103.6 |
| Methyl methacrylate | 506.8 |
| Styrene | 88.2 |
| Methacrylic acid | 261.8 |

At the end of the 3-hour polymerization, a chaser is used to decrease the amount of unreacted monomer. Butyl Cellosolve (240 g) is added. The final solids is 71.8 weight percent; the viscosity is greater than 10,000 centipoise at 25° C. The weight average molecular weight is approximately 25,000, and the heterogeneity index is about 2.5.

EXAMPLE B11

The process and equipment employed are similar to those used in Example B9. The polymerization is conducted over a 6-hour period with the temperature maintained in the range of 146°–154° C. The kettle charge is butyl Cellosolve (415 g) and 2-hydroxyethyl mercaptan (10 g). The initiator stream is t-butyl peracetate, 75% in mineral spirits, (53.3 g). The monomer stream consists of:

|  | Grams |
| --- | --- |
| n-Butyl methacrylate | 230 |
| Methyl methacrylate | 520 |
| Methacrylic acid | 250 |

At the end of the 6-hour polymerization, a chaser is used to decrease the amount of unreacted monomer. The solids is 71 weight percent, calculated and found, $\overline{M}_w$ is 8420, $\overline{M}_n$ is 3140 and heterogeneity index is 2.7. Dimethylaminoethanol (259.4 g) is added to neutralize the acid, reducing the solids to 60%. Water is added, reducing the solids to 50% by weight and the viscosity to 20,000 centipoise at 25° C.

EXAMPLE B12

Ethoxylation of Hydrolyzed Oligomer

The following ingredients are added to an autoclave:
a. The hydrolyzed product of Example B5 (450 g), having 6.27 milliequivalents of carboxylate per gram of solids, is dissolved in 90 parts toluene and 10 parts isobutanol to give a 55.6 weight percent solution.
b. Ethylene oxide (81.8 g)
c. Tetrapropyl ammonium bromide (1.25 g)
d. Toluene (50 g).

The ingredients are stirred and heated in the autoclave for 4 hours at 100° C., during which time the gauge pressure decreases from 30 psi to 5 psi. After cooling, the product is removed from the autoclave which is rinsed with acetone, the rinsings being added to the product. In another vessel, the product is stripped at 90° C. and 10 mm Hg pressure for 2 hours to yield 525 g of product having 1.05 milliequivalents of carboxylate per gram of solids and a hydroxyl number of 215 (corresponding to 50% hydroxyethyl methacrylate in the polymer). This product is dissolved in water and DMAE at a pH of 9.0 to yield a final product having:
73.3% solids
9.0 pH
3300 cps viscosity
1220 weight average molecular weight
980 number average molecular weight
1.24 heterogeneity index

EXAMPLE B13

The process and equipment employed are similar to those used in Example B9. The polymerization is conducted over a 6-hour period with the temperature maintained in the range of 146°–154° C. The kettle charge is butyl Cellosolve (415 g) and 2-hydroxyethyl mercaptan (30 g). The initiator stream is t-butyl peracetate, 75% in minearl spirits, (53.4 g). The monomer stream consists of:

|                    | Grams |
| ------------------ | ----- |
| n-Butyl methacrylate | 230 |
| Methyl methacrylate  | 520 |
| Methacrylic acid     | 250 |

At the end of the 6-hour polymerization, a chaser is used to decrease the amount of unreacted monomer. The final solids is 71.4 weight percent, calculated and found, $\overline{M}_w$ is 5310, $\overline{M}_n$ is 1950 and heterogeneity index is 2.6. Dimethylaminoethanol (259.4 g) is added to neutralize the acid, reducing the solids to 61%. Water is used, reducing the solids to 50% by weight and the viscosity to 10,000 centipoise at 25° C.

EXAMPLE B14

The process and equipment employed are similar to those used in Example B9. The polymerization is conducted over a 6-hour period with the temperature maintained in the range of 146°–154° C. The kettle charge is butyl Cellosolve (415 g) and 2-hydroxyethyl mercaptan (60 g). The initiator stream is t-butyl peracetate, 75% in mineral spirits, (80 g). The monomer stream consists of:

|                    | Grams |
| ------------------ | ----- |
| n-Butyl methacrylate | 230 |
| Methyl methacrylate  | 520 |
| Methacrylic acid     | 250 |

At the end of the 6-hour polymerization, a chaser is used to decrease the amount of unreacted monomer. The final solids is 69 weight percent found, 72% calculated, $\overline{M}_w$ is 3650, $\overline{M}_n$ is 1290 and heterogeneity index is 2.8. Dimethylaminoethanol (149 g) is added to neutralize the acid, reducing the solids to 60.9%. Water is added, reducing the solids to 50% and the viscosity to 4900 centipoise at 25° C.

EXAMPLE C1

HARD COATING SYSTEM

The preliminary stability and compatibility test on the blend of the colloidal solution copolymer and the oligomeric copolymer is performed first. Equal parts by weight of the oligomeric copolymer of Example B1 and the copolymer of Example A5 are mixed, brought to a pH of 9.5 with dimethylaminoethanol and diluted with water to 28% total solids. The mixtrue shows no signs of gelation or phase separation when stored for 7 days at 140° F. nor in another aliquot stored at room temperature. The solution itself is clear as is a 1.5 mil film cast from the solution and baked at 250° F. for 20 minutes. Thus, this system is acceptable for formulation into a coating.

A ball mill grind is prepared from equal parts by weight, on a solids basis, of DuPont Tipure R-902 Rutile titanium dioxide pigment and the copolymer latex of Example A5 reduced to 25% solids with water and solubilized by bringing to a pH of 9.0 with dimethylaminoethanol. Then 0.5% defoamer is added, and the mixture is ball milled for 48 hours.

The let down premix is prepared from the following formulation, parts by weight:
  60 parts of the oligomeric copolymer of Example B1 reduced to 40% solids with water
  301 parts of hexamethoxymethyl melamine
  100 parts of isobutyl Cellosolve (Union Carbide)
  50 parts of n-butanol
  500 parts of water.

2000 parts of the ball mill grind and 750 parts of the copolymer latex of Example A5 reduced to 25% total solids with water and solubilized to a pH of 9.0 with dimethylaminoethanol are let down with the premix. The coating constants for this system are:
  titanium dioxide/binder is 50/50
  copolymer solids/melamine solids is 70/30
  total solids is 46%
  No. 4 Ford cup viscosity is 80 seconds.

The direct roll coating performance was observed on a Wagner Coater run at fast, moderate and slow speeds. Flow and leveling of the coating is rated very good to excellent. Fast, moderate and slow speeds on this coater correspond to 300, 200 and 100 feet per minute, respectively. The coating weighed 40 to 44 mg per 4 sq. in. on the 90-lb. tin plated steel substrate. For convenience, a separate sample is made, to test the film properties, by casting on the tin plate with a wire-wound rod. The coating is baked for 10 minutes at 350° F.; gloss at 20° is 69, at 60° is 90. The mar resistance is very good as is the resistance to blocking when the coated sheets, stacked face-to-face or face-to-back, are subjected to 30 p.s.i. for 16 hours at 120° F. and observed for signs of sticking or marring. The GMX adhesion (General Motors Specification test performed on an X scribed coating) is OK both dry and wet (150° F. water — 45 minutes). The gloss, flow and hardness of this system indicate that this is an excellent hard varnishless white coating.

EXAMPLES C2, C3 AND C4

OLIGOMER ACID LEVEL

In these examples, the formulation and processing are the same as in Example C1 with the following components:

The colloidal solution copolymer in these three examples is that of Example A3. In Example C2, the oligomeric copolymer is that of Example B1 (a butyl methacrylate/methyl methacrylate = ⅓ oligomer hydrolyzed to contain 25% methacrylic acid); in Example C3, that of Example B4 (the same oligomer hydrolyzed to contain 15% acid); and in Example C4, that of Example B3 (the same oligomer hydrolyzed to contain 7% acid). As in Example C1, the preliminary stability and compatibility tests give no indication of gelation or phase separation and the baked film is clear. Thus, these systems are acceptable for formulation into coatings.

The coating composition is made by the ball mill and let down procedure employed in Example C1, using the same crosslinker and other components. Direct roll coating of Examples C2 and C3 compositions show these to have excellent flow and leveling properties; whereas, the Example C4 coating composition is unacceptable in flow. It appears that 7% acid in the oligomer component is too low a level for acceptable direct roll coating.

In other tests, the coatings produced from Example C2 and C3 compositions are very resistant to water spotting and have good adhesion to the steel under pasteurization conditions, i.e., baked 45 minutes at 150° F. The Example C2 coating is excellent in both flexibility and mar resistance; the Example C3 coating is less resistant to these particular stresses.

EXAMPLES C5 THROUGH C11

ESSENTIALITY OF BINDER COMPONENTS

The preliminary tests outlined in Example C12 indicate acceptable stability and compatibility for the binder systems listed in the following table. Coating compositions, prepared by the ball mill and let down steps of Example C1, are applied to aluminum and tin plated steel substrates by direct roll coating. An appraisal of the appearance of the coatings is in the last column of the table. Examples C5, C6 and C7 are appropriate high molecular weight solution or colloidal solution/oligomer/crosslinker blends and perform well in direct roll coating. Example C8 substitutes a single polymer for the oligomer and the high molecular weight polymer of the blend. This polymer has the same overall composition as the blend and approximately the same average molecular weight as the blend; however, it is homogenous in its molecular weight distribution, whereas the blend must have at least two peaks in the molecular weight distribution curve. Examples C9 and C10 combine the components of Example C5 (or C6) separately with the crosslinker; each results in an unacceptable coating. The oligomer component without crosslinker also results in a coating which is unacceptable in appearance when applied by a direct roll coater. It is clear from these results that the excellent performance of the coatings compositions of this invention is ascribable neither to the components singly nor to the overall compositions nor the average molecular weight. Excellent direct roll coating formulations are achieved by the blending of compatible systems, a very low molecular weight oligomer, a high molecular weight polymer, with a water-borne crosslinker.

In the table, parts by weight of the coatings components refer to the appropriately designated Examples; thus, "44 A3" means 44 parts by weight of the composition of Example A3.

| | BINDER SYSTEM (PARTS BY WEIGHT 30 PARTS HEXAMETHOXYETHYL MELAMINE CROSSLINKER) | | | SOLVENT SYSTEM | COATING | | DIRECT ROLL |
|---|---|---|---|---|---|---|---|
| EXAMPLE | UNIMODAL POLYMER | COLLOIDAL SOLUTION POLYMER | OLIGOMER | PARTS BY VOLUME OF SOLVENT COMPONENTS | PERCENT SOLIDS | VISCOSITY (NOTE 1) | COATING APPEARANCE |
| C5 | — | 44 A3 | 26 B1 | 7 n-butanol/93 water | 47.5 | 66 | Excellent |
| C6 | — | 44 A3 | 26 B1 | 6 2-butoxyethanol/7 n-butanol/87 water | 47.5 | 66 | Excellent |
| C7 | — | 44 A3 | 26 B9 | 6 2-butoxyethanol/7 n-butanol/87 water | 47.0 | 57 | Excellant |
| C8 | 70 B10 | — | — | 20 2-butoxyethanol/80 water | 45.2 | 61 | Unacceptable |
| C9 | — | 70 A3 | — | "Same as Ex. C8" | 37.2 | 63 | Unacceptable |
| C10 | — | — | 70 B1 | "Same as Ex. C8" | 58.3 | 71 | Unacceptable |
| C11 | — | — | 100 B1 (no crosslinker) | "Same as Ex. C8" | 57.4 | 31 | Unacceptable |

Note 1:
Efflux time, in seconds, from No. 4 Ford cup.

EXAMPLE C12

SELECTION OF STABLE COMPATIBLE SYSTEMS

A series of preliminary tests is performed on equal weight blends of the oligomeric polymer and the high molecular polymer at 28% total solids in an aqueous solution adjusted to a pH of 9.5 with dimethylaminoethanol. The tests are:

Stability: The blend is held at 140° F. for seven days. Partial or complete gelation of the sample or visible phase separation indicate instability.

Solution Compatibility: The blend is observed for clarity upon mixing and after aging at room temperature for 14 days. Phase separation, opacity or haziness sufficient to make newspaper type illegible when read thru a two-centimeter depth of blend indicates lack of compatibility.

Film Compatibility: The blend is cast on a metallic substrate to form a 1.5 mil dry film which is baked at 250° F. for 30 minutes. Haze or lack of clarity indicates lack of compatibility.

Results of these tests, as applied to several of the polymers in the A and B series of examples, are given in the following table.

| Colloidal Solution Polymer | Oligomer | Stability | Solution Compatibility | Film Compatibility | Acceptable |
|---|---|---|---|---|---|
| Example A5 | Example B8 | good | clear | clear | yes |
| " | Example B5 | good | hazy | clear | no |
| " | Example B12 | good | slight haze | clear | yes |
| " | Example B7 | good | hazy | clear | no |
| Example A4 | Example B8 | gels | — | — | no |
| " | Example B5 | gels | — | — | no |
| " | Example B12 | good | slight haze | clear | yes |
| " | Example B7 | gels | — | — | no |
| Example A3 | Example B8 | good | clear | clear | yes |
| " | Example B5 | gels | — | — | no |
| " | Example B12 | good | clear | clear | yes |
| " | Example B1 | good | clear | clear | yes |
| " | Example B7 | gels | — | — | no |
| " | Example B6 | separates | — | — | no |
| " | Example B2 | separates | — | — | no |
| Example A2 | Example B8 | good | opaque | clear | no |
| " | Example B5 | gels | — | — | no |
| " | Example B12 | gels | — | — | no |

| Colloidal Solution Polymer | Oligomer | Stability | Solution Compatibility | Film Compatibility | Acceptable |
|---|---|---|---|---|---|
| " | Example B7 | gels | — | — | no |

The components of acceptable blends are formulated into clear and pigmented coatings as in Example C1. The coatings transfer and flow well when applied by direct roll coating. Likewise, the coatings are also useful for application by less demanding processes such as reverse roll coating and spraying.

EXAMPLE C13

CROSSLINKER COMPONENT

A stable polymer blend is prepared employing the following formulations:

| Component | Weight Total | Polymer | Volatiles DMAE | BuETOH | nBuOH | $H_2O$ |
|---|---|---|---|---|---|---|
| Ex. A3 | 180 g | 63 g | 8.0 g | — | — | 109 g |
| Ex. B1 | 62 g | 37 g | 1.6 g | 15 g | 8.4 g | — |
| DMAE | 8 g | — | 8.0 g | — | — | — |
| Total | 250 g | 100 g | 17.6 g | 15 g | 8.4 g | 109 g |

(DMAE is dimethylaminoethanol, BuETOH is 2-butoxyethanol, nBuOH is n-butanol.)

To 350 gms of the blend, 650 gms of TiPure R-902 titanium dioxide is added to make a paste. The paste is ground on a three-roll mill, then let down with a mixture of 788 gms of the blend, 80 gms of bis N,N-di(β-hydroxyethyl)adipamide and 250 gms of water to form a base paint at 55.8% solids. This paint is diluted with 704 g water and 176 g 2-butoxyethanol to give a coating composition with 43% solids and a number 4 Ford cup viscosity of 43 seconds. Application of this composition to 90-lb. tin plated steel produced a good coating.

Similar results are obtained by the use of other crosslinking agents, in place of the substituted adipamide, such as:

(1) IONAC PFAZ-300 and IONAC PFAZ-301, both water-soluble crosslinking agents containing three aziridine groups per molecule (Ionac Chemical, a division of Sybron Corp., Birmingham, N.J.).

(2) Bis-$N^1,N^1$-trimethoxymethylureidomethyl ether.

(3) A polymeric soybean oil epoxide with the following properties:
Molecular weight 1000
Viscosity (25° C.) 350 cps.
Acid number 0.6
Saponification number 182
Oxirane number 6.4
Iodine number 13

(4) Pentamethoxymethyl methylol melamine.

(5) An aqueous emulsion of bisepoxides prepared from the following:

33.5 parts Epon resin 1007, an epichlorhydrin bisphenol A condensate with a molecular weight about 3700 (Shell Chemical Co.)

3.7 parts Epon resin 1001, a lower condensate than Epon resin 1007, with a molecular weight about 1000 (Shell Chemical Co.)

5.0 parts Alipal EP-110, a surfactant (G.A.F. Corp.)
12.6 parts deionized water, first addition
26.2 parts deionized water, second addition
16.9 parts Natrosol 250-HR, 1% in water, a hydroxyethyl cellulose (Hercules, Inc.)

The two Epon resins are dissolved, in an 80/20 by volume solution of ethyl amyl ketone/Cyclosol solvent 63, a high-boiling aromatic solvent (Shell Chemical Co.) to form a 75% by weight solution. The emulsion is prepared as follows:

The Epon resin 1007 and 1001 solution and the Alipal EP-110 are added to a jacketed Waring Blendor with thorough agitation and the temperature raised to 150° F. by means of heated water in the jacket. Mixing is continued for five minutes after temperature is reached.

The first addition of water is added slowly over a period of three minutes and mixed in thoroughly with vigorous agitation for five additional minutes. Temperature is maintained at 150° F. during this stage of preparation.

The blend of Natrosol solution and the final increment of water is then added over a three-minute period with moderate agitation. The pH of the system is adjusted to 7.0–7.5 with dimethylethanolamine while stirring.

EXAMPLES C14 THROUGH C17

MOLECULAR WEIGHT OF OLIGOMER

The preliminary tests outlined in Example C12 indicate acceptable stability and compatibility for the binder system listed in the following table. Coating compositions, prepared by the ball milling and let down steps of Example C1, are applied to aluminum and tin plated steel substrates by direct roll coating. Appraisal of the appearance of the coatings is given in the sixth and seventh columns of the table.

Example C14 is similar to Examples C2 and C5 but uses an oligomer sample prepared as a repeat of Example B1 and a solvent system of two parts 2-butoxyethanol and one part n-butanol. The other three examples in this group, C15, C16 and C17, are prepared by means of free radical initiation and represent a series varying in molecular weight. Example C15 uses an oligomer with a weight average molecular weight of 8420 and is unacceptable in flow and leveling when applied by direct roll coating. The next lower molecular weight oligomer, of weight average 5310 in Example C17, results in an acceptable coating.

| Example | Binder System[5] Colloidal Solution Polymer | Oligomer | Coating[6] Total Solids % | Viscosity[1] Sec. | Direct Roll[2] Coating Appearance | Gloss | Oligomer Properties $M_w$ | $M_n$ | H.I. |
|---|---|---|---|---|---|---|---|---|---|
| C14 | Example A3 | Example B1[3] | 44.7 | 72 | excellent | high | 1770[4] | 1340[4] | 1.3[4] |
| C15 | Example A3 | Example B11 | 44.7 | 80 | unacceptable | moderate | 8420 | 3140 | 2.7 |

-continued

| Example | Binder System[5] Colloidal Solution Polymer | Oligomer | Coating[6] Total Solids % | Viscosity[1] Sec. | Direct Roll[2] Coating Appearance | Gloss | Oligomer Properties $M_w$ | $M_n$ | H.I. |
|---|---|---|---|---|---|---|---|---|---|
| C16 | Example A3 | Example B13 | 44.7 | 64 | good | mod.-high | 5310 | 1950 | 2.7 |
| C17 | Example A3 | Example B14 | 44.7 | 60 | good | high | 3650 | 1290 | 2.8 |

[1]Determined in No. 4 Ford Cup.
[2]Determined by the quality of flow of the coating applied by direct roll coating.
[3]A repeat of the same preparation as in Example B1.
[4]Properties measured before hydrolysis.
[5]Binder composition: 44 parts colloidal solution polymer, 26 parts oligomer, 30 parts hexamethoxymethyl melamine by weight of solids.
[6]Solvent is 80 parts water, 13 2-butoxyethanol, 7 n-butanol by volume.

EXAMPLES C18 THROUGH C22

COMPARISON WITH OTHER BINDER SYSTEMS

Commercially available metal decorating binder systems are formulated into coatings for application by direct roll coaters with results given in the following table. Coating compositions, prepared by the ball milling and let down steps of Example C1, are applied to aluminum and tin plated steel substrates by direct roll coating. All contain an equal weight of $TiO_2$ and binder solids. Appraisal of the appearance of the coating is given in the second line of the table; the fourth line indicates the ease with which the roll coater may be cleaned when used with the given coating formulation.

Example C2, in the table, has been described above. The binder in Example C18 is a three-component blend consisting of:

1. an emulsion copolymer of styrene, n-butyl acrylate, methacrylamide and methacrylic acid;
2. an isopropanol solution of a methanol capped urea-formaldehyde-condensate; and
3. a solution of a methanol capped melamine-formaldehyde condensate in equal parts of isopropanol and isobutanol;

and further having as a rheology modifier Carbowax 20M (polyethylene glycol polymer) in an amount corresponding to 1.3% of the binder. The binder in Example C19 is a blend of component 3 of Example C18 and a colloidal solution copolymer of methyl methacrylate, ethyl acrylate, hydroxypropyl methacrylate and methacrylic acid with the same rheology modifier as in Example C18. Example C20 utilizes a blend of a water-soluble polyester resin and a methoxymethyl melamine as a binder. A water-reducible copolymer of methyl methacrylate, n-butyl acrylate, hydroxyethyl methacrylate and methacrylic acid is the binder in Example C21. Example C22 differs from all of the others in being a copolymer of styrene, ethyl acrylate and methacrylic acid blended with a diepoxide made from bisphenol A and epichlorhydrin dissolved in an organic solvent, Solvesso 150 (a high-boiling aromatic) and Cellosolve Acetate.

We claim:

1. A thermosettable composition adapted for roller coating of substrates, comprising a binder consisting essentially of an aqueous alkaline blend of:
   (A) a copolymer of (1) 3% to about 30% by weight of an olefinically unsaturated monomer containing a carboxyl group or mixture thereof, (2) at least one ester of acrylic or methacrylic acid and, optionally, (3) other vinyl monomers, the total of (1), (2) and (3) being 100%, the weight average molecular weight of the copolymer being between 10,000 and 500,000, in the form of a solution or a colloidal solution in the aqueous blend as a salt of a volatile amine or ammonia;
   (B) an oligomeric copolymer of (1) at least one ester of acrylic or methacrylic acid, (2) 9% to about 50% of an olefinically unsaturated monomer having at least one carboxyl group and, optionally, (3) other vinyl monomers, the total of (1), (2) and (3) being 100%, the weight average molecular weight of the copolymer being between 400 and 6,000, the molecular weight distribution is such that the heterogeneity index is 3 or less, in the form of a solution in the aqueous blend; and
   (C) a crosslinking agent selected from the group consisting of:
   (a) an alcohol-modified aminoplast resin comprising the condensation product of an aldehyde and a compound selected from the group consisting of ureas, polyamides and triazines;
   (b) a polyepoxide containing at least two vic-epoxy groups in which the epoxy oxygen atom is attached to adjacent carbon atoms;
   (c) a polyaziridine containing at least two aziridinyl groups; and
   (d) a β-hydroxyalkylamide of the formula:

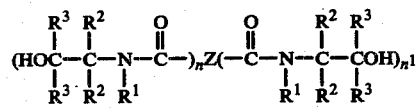

containing at least two β-hydroxyalkylamide groups wherein

| Property | Example C2 Blend | Example C18 Modified Emulsion | Example C19 Modified Colloidal Solution | Example C20 Water-Soluble Polyester | Example C21 Water-Soluble Acrylic | Example C22 Solvent-Soluble Acrylic |
|---|---|---|---|---|---|---|
| Direct Roll Coat Flow | Excellent | Unacceptable | Unacceptable | Unacceptable | Unacceptable | Excellent |
| Gloss:20° | ~65 | ~23 | ~51 | ~60 | ~62 | ~66 |
| 60° | ~90 | ~65 | ~86 | ~86 | ~84 | ~90 |
| Open time and clean-up | Excellent | Fair | Very Poor | Good | Good | Excellent |

Z is a bond, hydrogen, a monovalent or polyvalent organic radical derived from a saturated or unsaturated alkyl containing from 1 to 60 carbon atoms, aryl, tri-lower alkylene amino or an unsaturated radical;

$R^1$ is hydrogen, lower alkyl or hydroxyalkyl;

$R^2$ and $R^3$ are selected from hydrogen, straight or branched chain lower alkyl, or an $R^2$ and an adjacent $R^3$ can be taken together to form a saturated cycloalkyl;

n is an integer of 1 or 2; and $n^1$ is an integer of 0 to 2, and when $n^1$ is O and n has a value greater than 1, a polymer or copolymer formed from the β-hydroxyalkylamide when Z is an unsaturated radical, in the form of a dispersion or solution in water; in the blend, on a solids basis, C) being from 5 to 50 percent by weight, A) plus B) being from 95 to 50 percent by weight, with A) being from 95 to 25 percent and B being from 5 to 75 percent by weight of the total of A) plus B), and the blend having a volatile aqueous phase comprising 70 to 95 percent by volume of water, and 5 to 30 percent by volume of volatile organic solvents, the composition having between 15 and 70 percent solids by weight, with a viscosity between 25 and 150 seconds measured in a Number 4 Ford Cup at 25° C.

2. The composition of claim 1 in which component B) comprises (1) about 50% to 91% by weight, of one or more monomers selected from styrene, α-methyl, styrene, acrylonitrile, vinyl chloride, vinyl acetate, vinyl pyrrolidone, vinylidene chloride, and monomers of the formula:

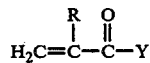

wherein

R is H or methyl; and

Y is an amino, a $(C_1-C_4)$alkylamino, a di$(C_1-C_4)$alkylamino, a hydroxy$(C_1-C_4)$alkylamino, a bishydroxy$(C_1-C_4)$alkylamino, a $(C_1-C_4)$alkoxy$(C_1-C_4)$-alkylamino, a bis-$(C_1-C_4)$alkoxy$(C_1-C_4)$alkylamino, or a group of the formula —$OR^4$;

wherein $R^4$ is a $(C_1-C_{24})$alkyl, a $(C_2-C_4)$alkenyl, a $(C_1-C_8)$aminoalkyl, an alkylaminoalkyl having up to 6 carbon atoms, a dialkylaminoalkyl having up to 6 carbon atoms, a group of the formula —$A^1N(R^3)CXNR^1R^2$;

wherein $R^3$ is selected from the group consisting of H, alkyl having 1 to 4 carbon atoms, hydroxyalkyl having 1 to 4 carbon atoms, and alkoxymethyl having 2 to 5 carbon atoms;

$A^1$ is an alkylene having 2 to 8 carbon atoms;

$R^1$, when not directly attached to $R^2$, is H, phenyl, methylbenzyl, benzyl, cyclohexyl, alkyl having 1 to 6 carbon atoms, hydroxyalkyl having 1 to 6 carbon atoms, or N-alkoxyalkyl having 2 to 6 carbon atoms;

$R^2$, when not directly attached to $R^1$, is H, phenyl, methylbenzyl, benzyl, cyclohexyl or alkyl having 1 to 6 carbon atoms;

$R^1$ and $R^2$, when directly connected together, is the morpholino residue —$C_2H_4OC_2H_4$—, the piperidino residue —$(CH_2)_5$—, or the pyrrolidino residue —$(CH_2)_4$—; and X is selected from the group consisting of oxygen and sulfur, a $(C_2-C_8)$isocyanatoalkyl, a $(C_2-C_8)$hydroxyalkyl, a 1,3-oxazolidin-3-yl-$(C_2-C_4)$alkyl, optionally having up to two $(C_1-C_4)$alkyl substituents on the oxazolidinyl ring, an allyloxyalkyl having up to 12 carbon atoms, an alkoxyalkyl having up to 12 carbon atoms, an aryloxyalkyl or aralkoxyalkyl having up to 12 carbon atoms, an aralkyl having up to 10 carbon atoms, an acryloyloxy$(C_1-C_4)$alkyl, a methacryloyloxy$(C_1-C_4)$alkyl, or polymerizable monoethylenically unsaturated molecules containing a cyclic ureido group of the formula:

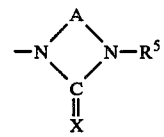

wherein

A is an alkylene having 2 to 3 carbon atoms;

$R^5$ is selected from the group consisting of H, —$CH_2OH$ and —$CH_2OCH_3$; and X is selected from the group consisting of oxygen and sulfur, and (2) 9% to about 50% of carboxylic acid monomers selected from acrylic acid, methacrylic acid and itaconic acid.

3. The composition of claim 1 in which component (B) has a heterogeneity index less than 1.5 and a weight average molecular weight between 500 and 2500.

4. The composition of claim 2 in which component B) is a copolymer of (1) about 50% to 91% by weight, of monomers which are esters or amides of acrylic acid or methacrylic acid or mixtures of these with each other or with other vinyl monomers and (2) 9% to about 50% of said carboxylic acid monomers.

5. The composition of claim 2 in which component B) comprises (1) about 50% to 91% by weight, of one or more $(C_1-C_8)$alkyl methacrylates and (2) 9% to about 50% of said carboxylic acid monomers.

6. The composition of claim 1 in which component B) is an anionically polymerized addition polymer or copolymer of at least one ester of acrylic or methacrylic acid wherein 9% to about 50%, by weight, of the mers are carboxylic acid groups, at least about 80% by weight of the polymer consists of molecules having chain lengths of about $\bar{n}/3$ to about $3.3\bar{n}$ mers, where $\bar{n}$ represents the average number of mers in the polymer chain.

7. The composition of claim 6 in which said anionically polymerized addition polymer contains mers having the structure:

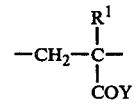

wherein $R^1$ is H or methyl; and

Y is an amino, a $(C_1-C_4)$alkylamino, a di$(C_1-C_4)$alkylamino, a hydroxy$(C_1-C_4)$alkylamino, a bishydroxy-$(C_1-C_4)$alkylamino, or a group of the formula —OR;

wherein

R is a hydrogen atom, a $(C_1-C_{24})$alkyl, a $(C_2-C_4)$alkenyl, a $(C_1-C_8)$aminoalkyl, an alkylaminoalkyl having up to 6 carbon atoms, a dialkylaminoalkyl having up to 6 carbon atoms, a group of the formula —A$^1$N(R$^3$)CXNR$^1$R$^2$;

wherein
R$^3$ is selected from the group consisting of H, alkyl having 1 to 4 carbon atoms, hydroxyalkyl having 1 to 4 carbon atoms, and alkoxymethyl having 2 to 5 carbon atoms;

A$^1$ is an alkylene having 2 to 8 carbon atoms;

R$^1$, when not directly attached to R$^2$, is H, phenyl, methylbenzyl, benzyl, cyclohexyl or alkyl having 1 to 6 carbon atoms, hydroxyalkyl having 1 to 6 carbon atoms, N-alkoxyalkyl having 2 to 6 carbon atoms;

R$^2$, when not directly attached to R$^1$, is H, phenyl, methylbenzyl, benzyl, cyclohexyl or alkyl having 1 to 6 carbon atoms;

R$^1$ and R$^2$, when directly connected together, is the morpholino residue —C$_2$H$_4$OC$_2$H$_4$—, the piperidino residue —(CH$_2$)$_5$—, or the pyrrolidino residue —(CH$_2$)$_4$—; and X is selected from the group consisting of oxygen and sulfur, a (C$_2$-C$_8$)isocyanato alkyl, a (C$_2$-C$_8$)hydroxyalkyl, a 1,3-oxazolidin-3-yl-(C$_2$-C$_4$)alkyl, optionally having up to two (C$_1$-C$_4$)alkyl substituents on the oxazolidinyl ring, an allyloxyalkyl having up to 12 carbon atoms, an alkoxyalkyl having up to 12 carbon atoms, an aryloxyalkyl or aralkoxyalkyl having up to 12 carbon atoms, an aralkyl having up to 10 carbon atoms, an acryloyloxy(C$_1$-C$_4$)alkyl, a methacryloyloxy(C$_1$-C$_4$)alkyl, or polymerizable monoethylenically unsaturated molecules containing a cyclic ureido group of the formula:

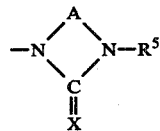

wherein
A is an alkylene having 2 to 3 carbon atoms;
R$^5$ is selected from the group consisting of H, —CH$_2$OH and —CH$_2$OCH$_3$; and
X is selected from the group consisting of oxygen and sulfur.

8. The composition of claim 7 in which R is a hydrogen or a (C$_1$-C$_8$)alkyl.

9. The composition of claim 6 in which the anionically polymerized addition polymer or copolymer is a hydrolysis product of a polymer or copolymer comprising mers having the structure:

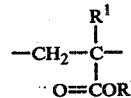

wherein R$^1$ is H or methyl, and R is a (C$_1$-C$_8$)alkyl.

10. The composition of claim 1 in which said olefinically unsaturated monomer of component A) is acrylic acid, methacrylic acid or itaconic acid.

11. The composition of claim 10 in which the ester of acrylic or methacrylic acid or a mixture thereof of component A) contains a group selected from a (C$_1$-C$_{24}$)alkyl, a (C$_2$-C$_4$)alkenyl, a (C$_1$-C$_8$)aminoalkyl, an alkylaminoalkyl having up to 6 carbon atoms, a dialkylaminoalkyl having up to 6 carbon atoms, a dialkylaminoalkyl having up to 6 carbon atoms, a group of the formula —A$^1$N(R$^3$)CXNR$^1$R$^2$; wherein R$^3$ is selected from the group consisting of H, alkyl having 1 to 4 carbon atoms, hydroxyalkyl having 1 to 4 carbon atoms, and alkoxymethyl having 2 to 5 carbon atoms;

A$^1$ is an alkylene having 2 to 8 carbon atoms;

R$^1$, when not directly attached to R$^2$, is H, phenyl, methylbenzyl, benzyl, cyclohexyl, alkyl having 1 to 6 carbon atoms, hydroxyalkyl having 1 to 6 carbon atoms or N-alkoxyalkyl having 2 to 6 carbon atoms;

R$^2$, when not directly attached to R$^1$, is H, phenyl, methylbenzyl, benzyl, cyclohexyl or alkyl having 1 to 6 carbon atoms;

R$^1$ and R$^2$, when directly connected together, is the morpholino residue —C$_2$H$_4$OC$_2$H$_4$—, the piperidino residue —(CH$_2$)$_5$—, or the pyrrolidino residue —(CH$_2$)$_4$—; and X is selected from the group consisting of oxygen and sulfur, a (C$_2$-C$_8$)isocyanatoalkyl, a (C$_2$-C$_8$)hyroxyalkyl, a 1,3-oxazolidin-3-yl-(C$_2$-C$_4$)alkyl, optionally having up to two (C$_1$-C$_4$)alkyl substituents on the oxazolidinyl ring, an allyloxyalkyl having up to 12 carbon atoms, an alkoxyalkyl having up to 12 carbon atoms, an aryloxyalkyl or aralkoxyalkyl having up to 12 carbon atoms, an aralkyl having up to 10 carbon atoms, an acryloyloxy (C$_1$-C$_4$)alkyl, a methacryloyloxy(C$_1$-C$_4$)alkyl, or polymerizable monoethylenically unsaturated molecules containing a cyclic ureido group of the formula:

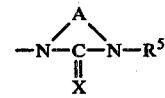

wherein
A is an alkylene having 2 to 3 carbon atoms;
R$^5$ is selected from the group consisting of H, —CH$_2$OH and —CH$_2$OCH$_3$; and
X is selected from the group consisting of oxygen and sulfur.

12. The composition of claim 11 in which said ester is a (C$_1$-C$_{12}$) acrylate or methacrylate.

13. The composition of claim 11 in which said ester is a (C$_1$-C$_4$) acrylate or methacrylate.

14. The composition of claim 10 wherein said vinyl monomers of component A) are selected from the group styrene, α-methyl styrene, acrylonitrile, vinyl chloride, vinyl acetate, vinyl pyrrolidone, vinylidene chloride and those of the formula:

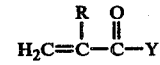

wherein
R is H or methyl; and
Y is an amino, a (C$_1$-C$_4$)alkylamino, a di(C$_1$-C$_4$) alkylamino, a hydroxy(C$_1$-C$_4$)alkylamino, a bishydroxy(C$_1$-C$_4$)alkylamino, a (C$_1$-C$_4$)alkoxy(C$_1$-C$_4$)alkylamino or a bis-(C$_1$-C$_4$)alkoxy(C$_1$-C$_4$)alkylamino.

15. The composition of claim 1 in which component (C) is a crosslinking agent which is an alcohol-modified aminoplast resin comprising the condensation product of an aldehyde and a urea or a melamine.

16. The composition of claim 1 in which component (B) is a hydrolysis product of an anionically polymerized addition polymer or copolymer comprising mers having the structure:

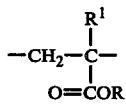

wherein
R$^1$ is H or methyl and
R is a (C$_1$–C$_8$)alkyl;
wherein 9% to about 50% by weight, of the mers comprise carboxylic acid groups, the weight average molecular weight of the copolymer being between 400 and 6,000 and at least about 80% by weight of the polymer consists of molecules having chain lengths of about $\bar{n}/3$ to about $3.3\bar{n}$ mers, where $\bar{n}$ represents the average number of mers in the polymer chain; in which component A) comprises a (C$_1$–C$_4$) ester of acrylic and/or methacrylic acid and 3% to about 30% of carboxylic acid monomers selected from acrylic acid, methacrylic acid and itaconic acid, and in which component (C) is an alcohol-modified aminoplast resin comprising the condensation product of an aldehyde and a urea or a melamine.

17. A pigmented or unpigmented thermosettable composition adapted for direct roller coating of substrates comprising a stable aqueous alkaline blend having a binder consisting essentially of:
(A) a copolymer of (1) about 20% to about 50% by weight of styrene, methyl methacrylate or both, about 40% to about 60% butyl acrylate and about 10% to about 20% methacrylic acid, the weight average molecular weight of the copolymer being between 20,000 and 75,000;
(B) a partially hydrolyzed anionically polymerized addition copolymer of methyl methacrylate and butyl methacrylate with an acid number being between 100 and 200, the weight average molecular weight being between 500 and 2500, the molecular weight distribution is such that the heterogeneity index is 1.5 or less; and
(C) a monomeric alcohol-modified condensation product of formaldehyde and melamine, in the form of a dispersion or solution in water,
wherein, on a solids basis, (C) is from 15 to 40 percent by weight, (A) plus (B) is from 85 to 60 percent by weight, and (A) is from 75 to 50 percent and (B) is from 25 to 50% by weight of the total of (A) plus (B), the blend further has a volatile aqueous phase comprising 80 to 95 percent by volume of water and 5 to 20 percent by volume of volatile organic solvents, and the composition has 15 to 20 percent solids by weight, with a viscosity of 25 to 150 seconds measured in the Number 4 Ford Cup at 25° C.

18. The composition of claim 4 in which the molecular weight of component (B) is between 500 and 2500 and the molecular weight distribution is such that the heterogeneity index is 1.5 or less.

19. The composition of claim 16 in which the aminoplast resin is hexamethoxymethylmelamine or pentamethoxymethylmelamine.

20. A substrate having the cured coating of the composition of claim 1.

* * * * *